United States Patent [19]
Schleupen et al.

[11] Patent Number: 4,696,002
[45] Date of Patent: Sep. 22, 1987

[54] RESETTING CIRCUIT FOR MICROPROCESSORS

[75] Inventors: Richard Schleupen, Ingersheim; Ulrich Mayer, Waiblingen; Bernhard Bauer, Renningen; Arnd M. Langner, Schwieberdingen, all of Fed. Rep. of Germany

[73] Assignee: Robert Bosch GmbH, Stuttgart, Fed. Rep. of Germany

[21] Appl. No.: 787,795

[22] PCT Filed: Mar. 20, 1985

[86] PCT No.: PCT/DE85/00089
§ 371 Date: Oct. 3, 1985
§ 102(e) Date: Oct. 3, 1985

[87] PCT Pub. No.: WO86/00155
PCT Pub. Date: Jan. 3, 1986

[30] Foreign Application Priority Data
Jun. 9, 1984 [DE] Fed. Rep. of Germany ....... 3421584

[51] Int. Cl.$^4$ ............................................. G06F 11/04
[52] U.S. Cl. .......................................... 371/12; 371/62; 371/66

[58] Field of Search .................. 371/66, 62, 12, 5, 16, 371/21; 364/200, 900, 482, 431.11

[56] References Cited

U.S. PATENT DOCUMENTS

| 4,528,629 | 7/1985 | Breitling | 371/62 |
| 4,538,273 | 8/1985 | Lasser | 371/62 |
| 4,586,179 | 4/1986 | Sizari | 371/62 |
| 4,586,180 | 4/1986 | Anders | 371/62 |

FOREIGN PATENT DOCUMENTS 0004848 1/1981 Japan ..................................... 371/12

Primary Examiner—Michael R. Fleming
Attorney, Agent, or Firm—Michael J. Striker

[57] ABSTRACT

A reset circuit is suggested for a microprocessor with which the microprocessor is reset, if the predetermined program ranges are left. During each cyclical input signal it is determined whether an output signal appears after a predetermined time. If this is not the case the reset process is performed. The reset process is also initiated if a predetermined output of the microprocessor remains in a defined position over an unduly long time.

6 Claims, 5 Drawing Figures

RESETTING CIRCUIT FOR MICROPROCESSORS

BACKGROUND OF THE INVENTION

The invention relates to a resetting device for microprocessors. Resetting circuits for microprocessors have been known for a long time. On the one hand, they serve to put the microprocessor in a defined output stage when the voltage supply is applied. On the hand hand, resetting circuits have been already suggested, which cause a resetting of the microprocessor, if the program stored in the microprocessor is not orderly operated. For this purpose signals are generated at an output of the microprocessor. These signals occur once during each running through a program, for example. If these signals fail to occur for a long time a resetting pulse is emitted. However, this process of resetting is not reliable in all cases. For example, a failure of the microprocessor may occur when a jump occurs in the program range of the data range (RAM or ROM). The program order is defined by the data stored in the data range. Thus, endless loops can form to which an output of the microprocessor can respond. Although the microprocessor does not function properly no resetting is provided in the known circuits, since pulses are present at the output of the microprocessor. This can result in that the device operated by the microprocessor does not work. In the worst case damages may occur in the device, namely when consumers are switched on, which by definition are only charged for a short time, so that an erroneous circuit of the microprocessor is permanently charged.

SUMMARY OF THE INVENTION

It is an object of the invention to provide a resetting device which is advantageous in that a monitoring of the operability of the microprocessor in dependence from cyclically applied input signals is performed. If a predetermined, defined reaction of the processor is not triggered by an input signal within a given time, it is to be assumed that the microprocessor does not operate sufficiently. For this purpose it is immaterial how the signals appear at the defined output. An error is recognized if a defined time sequence does not occur between the cyclic input signal and the signal at the output.

Advantageously, a switch may be provided which suppresses signals for a short time. Thus, the total resetting circuit can be simply constructed. Switching means for the control of a microprocessor may be already installed, so that signals which are generated for a short time and which are caused by switching conditions can be suppressed. It is also favorable to lock the switch for a predetermined time when a single signal occurs. In this manner it is possible to evaluate the time delay between the signal to be put in and the reaction of the output. If the output has not reacted within a predetermined time, the resetting pulse is triggered by opening of the switch.

For securing the endangered consumer if the cyclic input signal is missing or during the program throughput it is advantageous to evaluate at least a further output of the microprocessor, if it remains longer in its predetermined position. The triggering of the resetting pulse is simply carried out by charging or unlocking of a condensor by means of resistors. The use of monostable tilting members is also possible and advantageous. In order to obtain a quick switching off of the reset pulse it is advantageous to bridge the one part of the resistors for loading and unloading the condensor with diodes. Thus, a quick re-running of the microprocessor can be obtained after a case of interference.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

The drawings show resetting circuits which are particularly suitable for computers, whose RAM is in the normal address range, that is, it can be selected from the program counter. The danger exists in these microprocessors that during the processing of programs which are normally stored in the ROM-range a jumping into the RAM-range may occur, wherein the data are stored. Therefore, the data are now interpreted by the computer as program steps. This can result in completely unexpected results. In particular the proper operating condition of the device which is provided with the microprocessor is no longer assured. On the contrary, the danger exists that the device itself may be damaged under certain circumstances. By way of example, a control device for the electrical ignition installation of a motor vehicle is mentioned. If the microprocessor jumps from the program range into the data range, it may result in that faulty ignitions are generated in the vehicle, on the one hand, which finally would result in a damage to the motor. On the other hand, the possibility exists that the microprocessor moves in an endless loop which it cannot leave. In this case the vehicle is not in a proper operating condition. Finally, the microprocessor may stop at any given position in the program or data range, so that a further operation is no longer possible. If the ignition device is switched on and is controlled by the microprocessor, in this situation, consequently a permanent ignition current flows through the ignition coil which could heat up under these circumstances, which in turn results in an overloading of the ignition coil. This could result in a destruction of the ignition installation.

Figure 1:
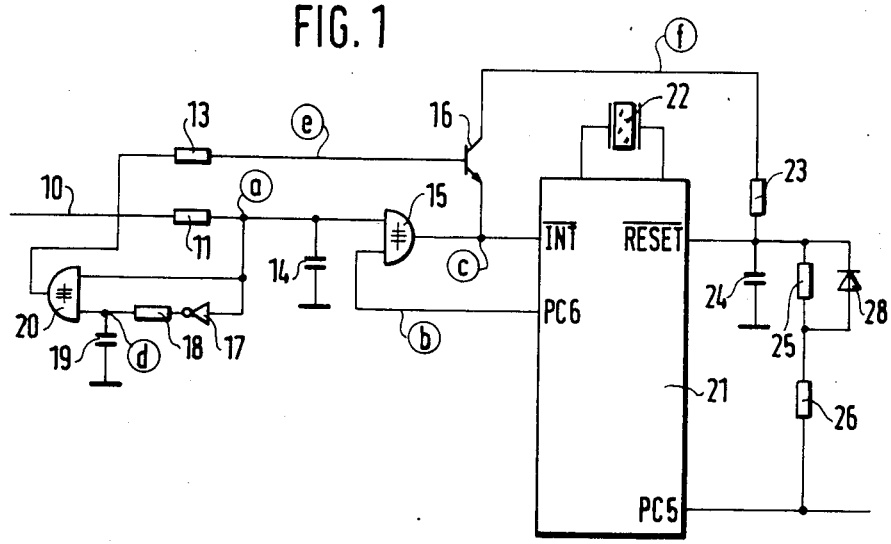
FIG. 1 shows a first exemplified embodiment of the invention.

FIG. 1 shows a resetting circuit which resets the microprocessor in case of an erroneous behavior and effects a new start. A pulse transmitter is connected to line 10, for example, a Hall transmitter of an ignition installation. Line 10 is connected with the input of an antivalence member 15 by means of line 10. From this input of the antivalence member 15 a condenser 14 is switched to ground. The output of the antivalence member leads to the emitter of a transistor 16, on the one hand, and to an interruption input $\overline{INT}$ of the microprocessor 21, on the other hand. The output PC6 of the microprocessor 21 is connected with a further input of the antivalence member 15. Furthermore, a line branches off between the resistor 11 and the antivalence member 15 leading to the input of an inverter and an antivalence member 20. A condenser 19 extends from this input to the common ground line. The output of the antivalence member 20 is connected with the base of transistor 16 by means of a resistor 13. The collector of the transistor 16 is connected a resistor 23 which is connected to the reset input $\overline{RESET}$. Furthermore, the reset input is connected to the condenser 24 which is switched to the ground. For example, a further output PC5 of the microcomputer leads to a switching switch step, not shown. From this line a resistor 26 and a resistor 25 are connected in series and also to the reset input of the microprocessor 21. The resistor 25 is thereby switched in parallel with a diode 28. A quartz 22 provides a cycle signal of a cycle circuit which is mounted in the microprocessor 21.

Figure 2:
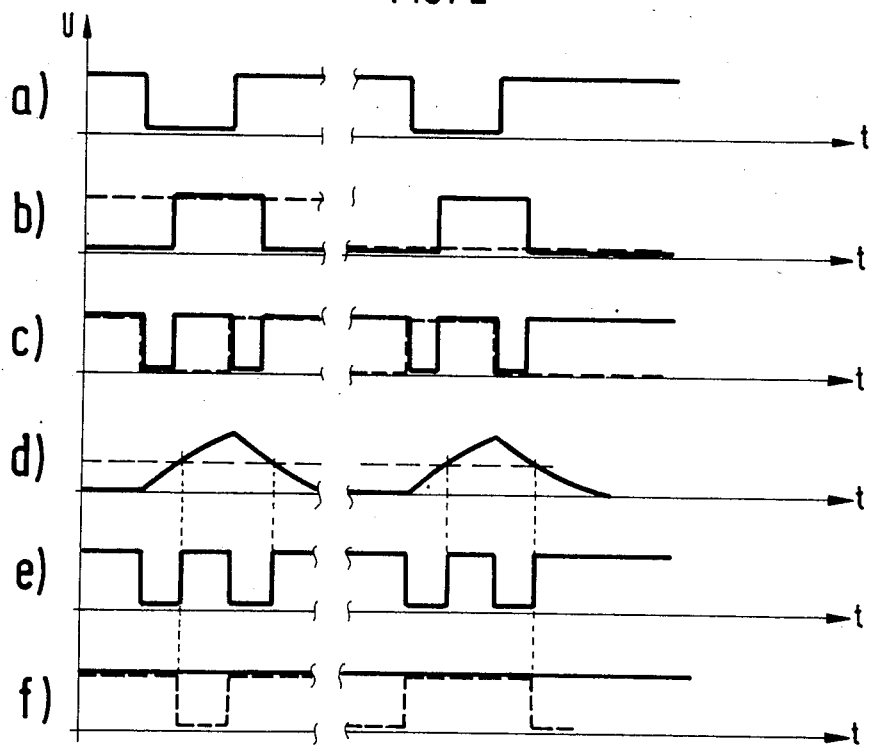
FIG. 2 shows a diagram for clarifying the invention.

The mode of operation of the circuit in accordance with FIG. 1 is explained in more detail in conjunction with the diagram of FIG. 2. The cyclic signal of a transmitter is applied to line 10, for example, the signal of an ignition pulse transmitter. This signal in accordance with FIG. 2a reaches the interruption input INT by way of the antivalence member 15. The signal at the interruption input of the microprocessor is processed by the same and switches the output PC6 into reverse afer a delay. The signal emitted from the microprocessor at the output PC6 is illustrated in FIG. 2b. Due to the programming of the microprocessor the output signal is processed in a time delay and is inverted to a signal through condenser 14. Since this signal is connected with the signal of the transmitter by means of the antivalence member 15, a signal in accordance with FIG. 2C (full line) is applied to the interruption input of the microprocessor 21. This type of signal shows that on the increasing as well as descreasing flank of the signal in accordance with FIG. 2a an interruption is triggered. The interruption causes that a certain program process is started. Simultaneously, the transmitter signal is inverted by the inverter 17, so that the condenser 19 charges or discharges through resistor 18, as is shown in FIG. 2d. Blanking pulses in accordance with FIG. 2e are obtained due to the antivalence connection 20 of the transmitter signal with the charge condition of condenser 19 which occur at each flank of the transmitter signal. The length of these blanking pulses is determined by the time behavior of the RC-member with the resistor 18 and the condenser 19. This time behavior is so selected that the blanking pulses in accordance with FIG. 2e are longer than the pulses to be expected in accordance with FIG. 2c, whose duration is determined by the time until a pulse is emitted after a flank change of the transmitter to line 10 at the output PC6 of the microprocessor. Depending on the computing time until this moment one has to select the blanking signals accordingly long. These blanking pulses serve to arrest the transistor 16, so that the interruption pulses are not erroneously recognized as reset pulses. During the blanking pulses in accordance with FIG. 2e, the pulses in accordance with FIG. 2c cannot lead to a flow through resistor 23. The condenser 24, whose discharge could generate the resistor 23, can therefore not be discharged through transistor 16, while the interruption pulses are present. Therefore, a reset signal is not applied to the reset input of the microprocessor 21 in accordance with FIG. 2f (solid line).

In the case of an erroneous behavior of the program it can be expected that a delayed signal in accordance with FIG. 2b does not occur at the output PC6. In dependence from the point in time at which the microprocessor jumps out of the program, a logical 1 or a logical 0 may be permanently present at output PC6. If the microprocessor operates indefinably in a loop, rapid rectangular pulses may be generated. On the left side of FIG. 2 the case is illustrated in which a logical 0 is permanently applied to output PC6. In FIG. 2b it is illustrated in dash dotted lines. No short pulses are generated during the flank change of the transmitter signal at the output of the antivalence member 15, but the transmitter signal is again reproduced (FIG. 2e). Consequently, the signal in FIG. 2c is longer than the blanking signal in accordance with FIG. 2e, which can only be recovered from the transmitter signals. This means that the transistor 16 switches through, as long as the interruption signal at the output of the microprocessor 21 is still applied on a logical 0. The condenser 24 is now discharged through the relative low Ohm resistor 23 and the collector-emitter path of the transistor 16. FIG. 2f shows the voltage breakdown on the reset input of the microprocessor, by which the reset pulse is triggered.

Figure 3:
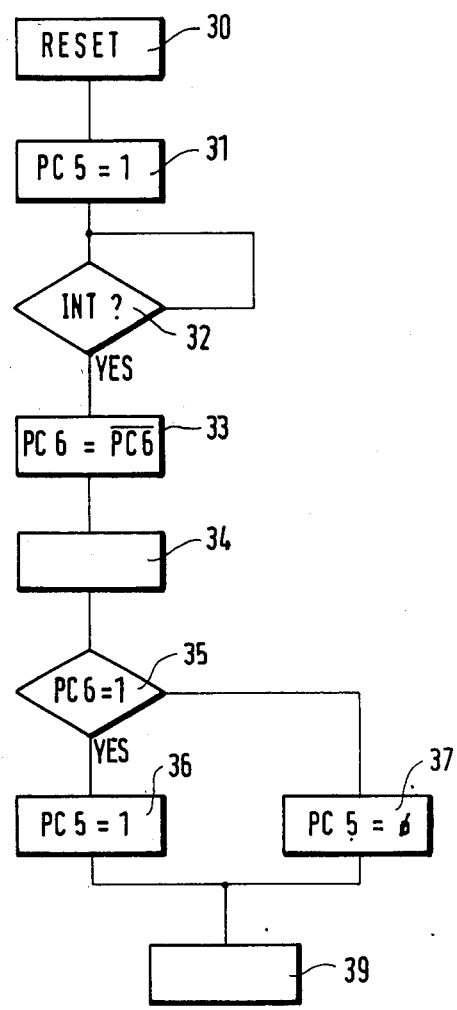
FIG. 3 shows a structural diagram clarifying the function of the microprocessor.

The right side of FIG. 3 shows the case in which permanently a logical 1 is emitted from the output PC6 of the microprocessor 21. In this case the inverted signal of the transmitter is applied to the interruption input of the microprocessor due to the antivalence member 15, as shown in FIG. 2c. In this case the condition 0 on the interruption input is also much longer than the blanking pulses in accordance with FIGS. 2e, so that in accordance with FIG. 2f the condenser 24 is again discharged. Thereby, an interruption is also triggered which resets the microprocessor to its initial position.

By way of example, the mode of operation of the microprocessor will be explained in accordance with the structure diagram of FIG. 3. During a reset pulse, which by way of example is triggered also during switching on of the microprocessor of the condenser 24 which at this point is discharged, so that the microprocessor is set to its initial condition 30. The microprocessor is then put into his initial position at 31. Thereby, essential parameters are provided with predetermined initial conditions. Of particular interest is the essential output PC5 which is set to a logical 1. A logical 1 at the output PC5 of the microprocessor means that a subsequent ignition device is switched off, for example, so that no current can flow through the ignition coil. At the interrogation location 32 the microprocessor waits whether it receives a signal at the interruption input. If no signal is generated it operates in a loop or the remainder of the program is worked off. If a signal is generated in accordance with FIG. 2c, the computer program is started. After a predetermined time the output signal of the output PC6 is inverted at location 33. This means, a logical 1 is switched to a logical 0, and a logical 0 into a logical 1. In our application case this means that after each pulse flan flank from 1 to 0 in accordance with FIG. 2c the output PC6 changes its condition, as shown in FIG. 2b. This condition change is omitted if the microprocessor has left the program at this point in time. Thereafter, the computer operations 34 are worked. For example, internal counters may be set, so that times can be picked up or other operations may be initiated. At a further interrogation location it is now determined whether the output port PC6 has the condition 1. If this is the case, the output port PC5 is switched to a logical 1 independently from it previous condition at the location 36, but otherwise to a logical 0 at the location 37. With this program which should be used specifically with an ignition it can be recognized whether the transmitter emitted a positive or a negative flank, i.e., whether an ignition should be initiated or whether the ignition coil should at first be charged. In any case an ignition process is initiated during the transition from 1 to 0 at the output PC5 of the microprocessor. Thereafter, further computer operations may be performed at location 39.

If interferences occur in the computer operation and therefore at the output PC6 in such a manner that the output is constantly switched back and forth because, for example, a new loop had been formed with the location 34, which does not take the other program parts into consideration, a resetting of the computer occurs, because it is to be expected that a switching of the interruption is performed to 0 due to the pulse sequence which is not correleated with the input signal 10 outside of the blanking pulse in FIG. 2e, without this being intended. This too causes a discharge of the condenser 24.

It can also be seen that a discharge of the condenser 24 is performed through the resistors 25 and 26 if the microproceesor remains at location 37, for example, or remains idle in the program when the output PC5 is on logic 0. In this case the discharge of the condenser 24 is performed through resistors 25 and 26. Since after a performed resetting at the location 30 the output PC5 is simultaneously switched to 1 at the location 31, the resetting pulse must be rapidly cancelled. This is performed in that the condenser is again charged through the resistor 26 and the diode 28. If the resistance is selected very low, the charge process is performed much more rapidly than the discharge process through the relative high Ohm resistance 25. The resistor 25 is so selected with an application as an ignition control device, for example, that the discharge of the condenser 24 which occurs during the maximum possible switch on time does not yet result in a reset. Therefore the computer is operable in a short time.

Figure 4:
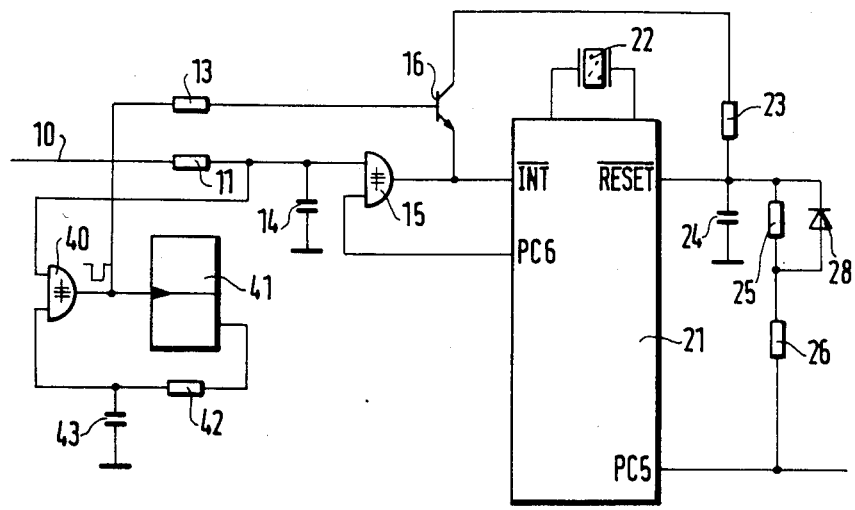
FIGS. 4 and 5 show further exemplified embodiments of the invention.
Figure 5:
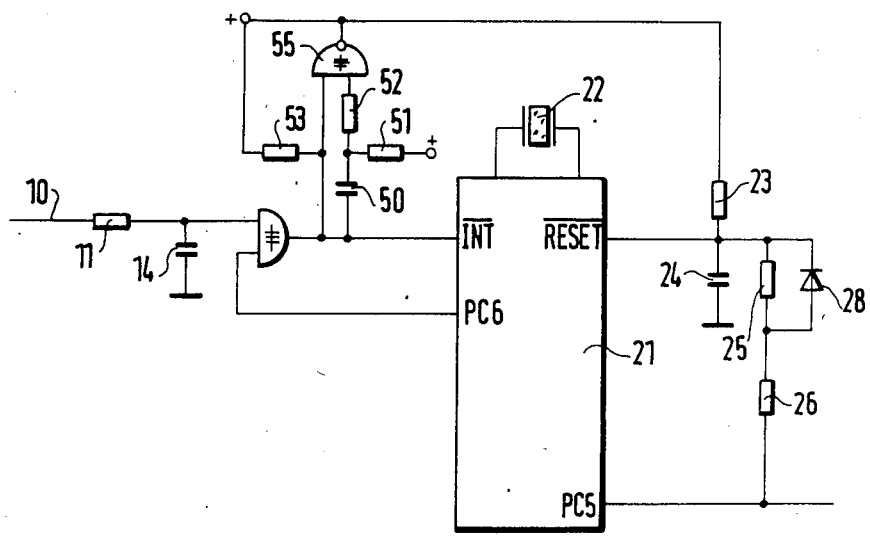

FIGS. 4 and 5 show further exemplified embodiments of the reset circuit in accordance with the invention. FIG. 4 again shows the line 10 with the connected pulse transmitter, whereby the pulses are fed through the resistor 11 and to the antivalence member 15. The output of the antivalence member 15 is again in connection with the interruption input of the microprocessor 21. The output PC6 of the microprocessor is connected to the further input of the antivalence member 15. A condenser 14 is switched to the ground between the resistor 11 and antivalence member 15, while a line simultaneously leads to an input of an antivalence member 40. The output of the antivalence member 40 is in connection with the input of a D-Flip-Flop 41 and with the base of the transistor 16 by means of a resistor 13. The output of the D-Flip-Flop 41 is switched by means of a resistor 42 to the further input of the antivalence member 40. From this input of the antivalence member 40 a further condenser 43 leads to the ground. The emitter of the transsitor 16 is in connection with the interruption input, while the collector is in connection with the reset input by means of a resistor 23. A condenser 24 leads to the ground from the reset input. The output PC5 is in connection with a switching device, not shown. Furthermore, a resistor 26 is switched in series with the resistor 25 and fed to the reset input. A diode 28 is disposed parallel to the resistor 25. The circuit has the same mode of operation as the one illustrated in FIG. 1.

The blanking pulses are again generated by a time member with the charge condenser 43 and the resistor 42.

In FIG. 5 a cyclical signal is fed through line 10 and the resistor 11 and to a condenser 14 which is switched to the ground and to an input of the antivalence member 15, while the further input of the antivalence member 15 is in connection with the output of the PC6 of the microprocessor. The output of the antivalence member 15 is fed to the interruption input of the microprocessor 21. Furthermore, one line feeds directly to one each input of an ignoring antivalence member 55, and a further line feeds through the series circuit of a RC-member with the condenser 50 and the resistor 52 to one each input of the ignoring antivalence member 55. Pull-up-resistors 53 and 51 are switched into the direct line as well as between the condenser 50 and the resistor 52. The output of the ignoring antivalence member has an open collector. The output is also in connection with the reset input of the microprocessor 21 by means of the resistor 23. The condenser 24 is switched from the reset input to the ground. A line leads from output PC5 to a control device, not shown, as well as to the reset input by means of the series circuit of resistors 26 and 25. The diode 28 is switched parallel to resistor 25. The quartz 22 in connection with a vibration circuit contained in the microprocessor 21 serves to generate the cycle signal for the microprocessor.

The mode of operation of the circuit is again the same as already described above. The time member is formed by the condenser 50 and the pullup-resistor 51. However, in view of the specific wiring the number of the required structural elements are particularly reduced.

We claim:

1. In a reset circuit for a microprocessor, in particular for a micro-processor for controlling systems in motor vehicles, said microprocessor being cyclically fed from a system to be controlled by input signals fed at an input of said microprocessor, said microprocessor having an output at which output signals are emitted, the improvement comprising means for receiving and combining said input signals with said output signals, said means (17 to 20, 40 to 43, 50 to 55) being connected to said input and output, respectively, and generating reset signals for said microprocessor if a predetermined output signal at said output of the microprocessor does not follow a switching signal of the cyclically fed signals.

2. Reset circuit in accordance with claim 1, further including a switch (16) connected to said input to supress the reset signals for a short time.

3. Reset circuit in accordance with claim 2, including means operative to arrest the switch (16) for a predetermined time when a signal to be fed to said microprocessor appears.

4. Reset circuit in accordance with claim 1, wherein said microprocessor has a further output (PC5), and wherein the reset signals are generated if, after a switching signal of the cyclically fed signals, at least said further output (PC5) of the microprocessor remains longer in a predetermined position than a predetermined time.

5. Reset circuit in accordance with claim 1, further including a condenser (24) connected to said microprocessor, and resistors (23, 25, 26) connected to said condensor, and wherein a reset pulse is triggered by charging or discharging of said condenser (24) by means of said resistors (23, 25, 26).

6. Reset circuit in accordance with claim 5, further including diodes (28) connected to said resistors so that the resistors are bridgeable, at least partially, by means of said diodes (28).

* * * * *